US011535181B2

(12) United States Patent
Floris et al.

(10) Patent No.: US 11,535,181 B2
(45) Date of Patent: Dec. 27, 2022

(54) TRAILER OR CONTAINER MOTORIZED COVER POWERED BY SUPERCAPACITOR

(71) Applicant: TY-CROP MANUFACTURING LTD., Rosedale (CA)

(72) Inventors: Jitze Floris, Kamloops (CA); Gary Wayne Teichrob, Rosedale (CA); Alan Arthur Martens, Chilliwack (CA); Ian Breeweg, Chilliwack (CA); Rick Jonker, Chilliwack (CA); Kevin James Standeven, Rosedale (CA)

(73) Assignee: Ty-Crop Manufacturing Ltd., British Columbia (CA)

( * ) Notice: Subject to any disclaimer, the term of this patent is extended or adjusted under 35 U.S.C. 154(b) by 189 days.

(21) Appl. No.: 16/588,058

(22) Filed: Sep. 30, 2019

(65) Prior Publication Data

US 2020/0282930 A1 Sep. 10, 2020

Related U.S. Application Data

(60) Provisional application No. 62/814,000, filed on Mar. 5, 2019.

(51) Int. Cl.
*B60J 7/08* (2006.01)
*H02J 9/06* (2006.01)
(Continued)

(52) U.S. Cl.
CPC ............. *B60R 16/033* (2013.01); *B60J 7/085* (2013.01); *H02J 7/0063* (2013.01); *H02J 9/061* (2013.01); *H02J 7/345* (2013.01)

(58) Field of Classification Search
CPC ....... B60R 16/033; B60J 7/085; H02J 7/0063; H02J 9/061
(Continued)

(56) References Cited

U.S. PATENT DOCUMENTS 4,212,492 A 7/1980 Johnsen
4,302,043 A 11/1981 Dimmer et al.
(Continued)

FOREIGN PATENT DOCUMENTS

CA 2350179 12/2001
CA 2428891 11/2004
(Continued)

OTHER PUBLICATIONS

Kapellsystem Orebro & Svedala, photos, https://www.facebook.com/Kapellsystem-Nya-i-%C3%96rebro-AB-400165496740992/photos_stream, retrieved on Jan. 8, 2019, 5 pages.
(Continued)

*Primary Examiner* — Michael R. Fin
(74) *Attorney, Agent, or Firm* — McAndrews, Held & Malloy, Ltd.

(57) ABSTRACT

An apparatus for covering an open top of a transportation trailer container, such as a chip train carrying wood chips, is provided. A flexible cover (e.g. tarp) may be deployed and retracted using a roller moved overtop of the container using pivotable arms. An electrically powered covering mechanism automatically deploys and retracts the cover. The covering mechanism is powered by a supercapacitor, which is charged when connected to an external power source. A charging control circuit can selectably allow or inhibit charging of the supercapacitor depending on power demands of other electrical loads.

17 Claims, 9 Drawing Sheets

150 120 128 124 100 130 122 134 132 105 154 152 140 138 136

(51) Int. Cl.
*H02J 7/34* (2006.01)
*B60R 16/033* (2006.01)
*H02J 7/00* (2006.01)

(58) Field of Classification Search
USPC .................................................. 307/9.1, 10.1
See application file for complete search history.

(56) References Cited

U.S. PATENT DOCUMENTS 4,380,350 A 4/1983 Block
RE31,746 E 11/1984 Dimmer et al.
4,484,777 A 11/1984 Michel
4,505,512 A 3/1985 Schmeichel et al.
4,518,193 A 5/1985 Heider et al.
4,673,208 A * 6/1987 Tsukamoto .............. B60J 7/085 160/321
4,691,957 A 9/1987 Ellingson
5,002,328 A 3/1991 Michel
5,180,203 A 1/1993 Goudy
5,186,231 A 2/1993 Lewis
5,211,441 A 5/1993 Barkus et al.
5,303,972 A 4/1994 Heider et al.
5,429,403 A 7/1995 Brasher
5,482,347 A 1/1996 Clarys et al.
5,573,365 A 11/1996 Michalski
5,697,663 A 12/1997 Chenowth
5,765,901 A 6/1998 Wilkens
5,829,819 A 11/1998 Searfoss
5,882,062 A 3/1999 Chenowth
5,887,937 A 3/1999 Searfoss
5,924,758 A 7/1999 Dimmer et al.
5,944,374 A 8/1999 Searfoss
6,142,553 A 11/2000 Bodecker
6,142,554 A 11/2000 Carroll et al.
6,199,935 B1 3/2001 Waltz et al.
6,206,449 B1 3/2001 Searfoss
6,380,481 B1 * 4/2002 Muller .................... B60L 8/003 136/244
6,457,622 B2 10/2002 Henning
6,481,779 B1 11/2002 Gothier et al.
6,513,856 B1 2/2003 Swanson et al.
6,575,518 B1 6/2003 Henning
6,595,594 B2 7/2003 Royer
6,712,419 B1 3/2004 Gothier
6,715,817 B2 4/2004 Nolan et al.
6,779,828 B1 8/2004 Poyntz
6,783,168 B2 8/2004 Searfoss
6,857,682 B2 2/2005 Eggers et al.
6,942,274 B2 9/2005 Henning
6,981,734 B2 1/2006 Martin
7,032,950 B2 4/2006 Eggers et al.
7,188,887 B1 3/2007 Schmeichel
7,246,838 B2 7/2007 Searfoss
7,275,780 B2 10/2007 Boyd et al.
7,513,561 B2 4/2009 Royer
7,594,687 B2 9/2009 Searfoss
7,726,720 B2 6/2010 Searfoss
7,841,642 B2 11/2010 Schaefer
7,866,725 B1 1/2011 Searfoss et al.
7,967,364 B1 6/2011 Kartes
7,980,619 B1 7/2011 Girardin
8,056,955 B1 11/2011 Schmeichel
8,172,301 B2 5/2012 Searfoss
8,172,477 B2 5/2012 Damsi
8,177,284 B1 5/2012 Royer
8,226,150 B1 7/2012 Schmeichel et al.
8,235,447 B2 8/2012 Damsi
8,272,676 B2 9/2012 Bremer
8,322,967 B2 12/2012 Owens et al.
8,360,502 B2 1/2013 Kartes et al.
8,424,951 B1 4/2013 Martin
8,444,206 B2 5/2013 Prince
8,465,080 B2 6/2013 Searfoss
8,496,283 B1 7/2013 Schmeichel et al.
8,534,742 B2 9/2013 Schmeichel et al.
8,641,123 B1 2/2014 Royer
8,666,595 B2 3/2014 Kartes
8,690,223 B2 4/2014 Barley
8,857,885 B2 10/2014 Schmeichel et al.
8,882,172 B2 11/2014 Reeder
8,910,996 B2 12/2014 Bremer
8,931,823 B2 1/2015 Bremer et al.
8,985,669 B2 3/2015 Schmeichel
9,039,065 B2 5/2015 Schmeichel
9,088,311 B2 7/2015 Knight et al.
9,136,694 B2 9/2015 Chenowth
9,150,086 B1 10/2015 Royer
9,254,776 B2 2/2016 Schmeichel
9,561,747 B2 2/2017 Royer
9,637,040 B1 5/2017 Berg
9,669,752 B2 6/2017 Bielfelt et al.
9,969,248 B1 5/2018 Searfoss
10,086,682 B2 10/2018 Schmeichel et al.
10,131,214 B2 11/2018 Bremer
10,155,435 B2 12/2018 Searfoss
10,160,297 B2 12/2018 Poyntz
2001/0030442 A1 10/2001 Henning
2002/0021018 A1 2/2002 Royer
2002/0067048 A1 6/2002 Haddad, Jr.
2002/0140248 A1 10/2002 White
2003/0034666 A1 2/2003 Wood
2003/0052505 A1 3/2003 Searfoss
2003/0052506 A1 3/2003 Royer
2003/0090124 A1 5/2003 Nolan et al.
2003/0151271 A1 8/2003 Leischner et al.
2004/0000798 A1 1/2004 Royer
2004/0021336 A1 2/2004 Wood
2005/0088007 A1 4/2005 Royer
2007/0222253 A1 9/2007 Wood, Jr. et al.
2008/0116709 A1 5/2008 Royer
2008/0136211 A1 6/2008 Gomes et al.
2008/0217952 A1 9/2008 Royer
2008/0290686 A1 11/2008 Royer
2009/0179452 A1 7/2009 Searfoss
2010/0032978 A1 2/2010 Miller et al.
2010/0052357 A1 3/2010 Howell et al.
2010/0219656 A1 9/2010 Chenowth et al.
2010/0230993 A1 9/2010 Chenowth et al.
2010/0230994 A1 9/2010 Royer
2010/0253111 A1 10/2010 Reeder et al.
2010/0283285 A1 11/2010 Cramaro et al.
2011/0091271 A1 4/2011 Damsi
2011/0115247 A1 5/2011 Eggers
2011/0187148 A1 8/2011 Damsi
2011/0203865 A1 8/2011 Knight et al.
2011/0221233 A1 9/2011 Damsi
2011/0254310 A1 10/2011 Royer
2011/0266826 A1 11/2011 Prince et al.
2012/0001449 A1 1/2012 Kartes et al.
2012/0080968 A1 4/2012 Knight et al.
2012/0181812 A1 7/2012 Searfoss
2012/0235440 A1 9/2012 Searfoss
2012/0265369 A1 10/2012 Knight et al.
2013/0175822 A1 7/2013 Eggers
2013/0204461 A1 8/2013 Kartes
2013/0234466 A1 9/2013 Schmeichel
2013/0249236 A1 9/2013 Smith et al.
2013/0313855 A1 11/2013 Schmeichel
2014/0203589 A1 7/2014 Bremer
2015/0306943 A1 10/2015 Royer
2018/0111461 A1 4/2018 Searfoss
2018/0138716 A1 * 5/2018 Bailey .................... B64D 47/00
2018/0319258 A1 11/2018 Searfoss
2019/0061704 A1 * 2/2019 Carroll ...................... B60S 1/66
2019/0077236 A1 * 3/2019 Teichrob .................. B60J 7/085
2019/0106068 A1 * 4/2019 Wang ...................... F15B 11/10
2019/0217691 A1 7/2019 Eggers
2019/0233034 A1 * 8/2019 Viele .................... B62D 49/007

FOREIGN PATENT DOCUMENTS

CA 2568462 5/2008
CA 2580899 9/2008

(56) References Cited

FOREIGN PATENT DOCUMENTS

| | | |
|---|---|---|
| CA | 2589645 | 11/2008 |
| CA | 2707369 | 7/2009 |
| CA | 2726670 | 12/2009 |
| CA | 2730990 | 8/2011 |
| CA | 2696457 | 9/2011 |
| CA | 2743081 | 12/2011 |
| CA | 2753738 | 4/2012 |
| CA | 2754505 | 4/2012 |
| CA | 2721461 | 5/2012 |
| CA | 2764488 | 7/2012 |
| CA | 2764067 | 9/2012 |
| CA | 2805309 | 8/2013 |
| CA | 2808833 | 9/2014 |
| CA | 2850199 | 10/2015 |
| CA | 2853979 | 10/2015 |
| EP | 2853426 | 4/2015 |
| EP | 2505399 | 10/2015 |
| WO | 9824656 | 6/1998 |

OTHER PUBLICATIONS

Industridraperier AB, https://www.linkedin.com/company/industridraperier-ab?trk=extra_biz_viewers_viewed, retrieved on Jan. 8, 2019, 3 pages.
Kapellsystem Örebro & Svedala, photos, https://www.facebook.com/400165496740992/photos/pb.400165496740992.-2207520000.1461797352./465071893583685/?type=3&theater, retrieved on Jan. 8, 2019, 1 page.
Ecotop, http://www.ecotop.dk/da11, retrieved on Jan. 8, 2019,1 page.
Ecotop Danmark, photo, https://www.facebook.com/ecotop.jensen/photos/pcb.1096267037111508/1096265087111703/?type=3&theater, retrieved on Jan. 8, 2019,1 page.
Agri-Cover Roll Tarp Systems, Semi Trailer Tarps, http://www.agricover.com/rolltarps/ezloc/, retrieved on Jan. 8, 2019, 2 pages.
Agri-Cover Roll Tarp Systems, Electric Tarp Conversion System, http://www.agricover.com/rolltarps/roltecelectric/, retrieved on Jan. 8, 2019, 2 pages.
Roltec, Electric Tarp Conversion Features & Benefits, https://www.youtube.com/watch?v=6DS09PLdvYU, published Oct. 8, 2013, retrieved on Jan. 8, 2019, 3 pages.
Western Trailer with Autolock Electric Tarp, https://www.youtube.com/watch?v=34nrq8pyYFs, published Mar. 13, 2013,retrieved on Jan. 8, 2019, 3 pages.
Agri-Cover Roll Tarp Systems, Electric Tarps | Electric Roll Tarp System | AutoLock, http://www.agricover.com/rolltarps/autolock/, 2017, retrieved on Jan. 8, 2019, 2 pages.
Autolock® Electric Tarp: See it in Action on a Timpte Grain Trailer, https://www.youtube.com/watch?v=oQCkdJnUxio, published Jun. 12, 2014, retrieved on Jan. 8, 2019, 3 pages.
Roll-Rite® STS Series Tarp Systems for Transfer & Chip Trailers, http://www.rollrite.com/products/transfer-chip-trailers/, retrieved on Jan. 8, 2019, 4 pages.
Roll-Rite® STS Series Lock Down Trailer Tarp System with MultiFlex™, https://www.youtube.com/watch?v=JjZCWyq2KSQ, published on Feb. 19, 2015, retrieved on Jan. 8, 2019, 3 pages.
Roll-Rite® STS Series with Rite-Lock™ and MultiFlex™ Rear Arm Technology on Vimeo, https://vimeo.com/124448758, retrieved on Jan. 8, 2019, 2 pages.
Michel's Side-Roll Grain Tarp Systems, http://www.michels.ca/products/category/grain_body_tarp_systems.html, retrieved on Jan. 17, 2019, 4 pages.
Michel's Side-Roll Grain Tarp Systems, Select & Maximizer, http://www.michels.ca/ckfinder/userfiles/files/SR-Select%20Maximizer%20Brochure.pdf, 2 pages.
Shur-Co®, Products, http://www.shurco.com/agriculture/products/grain-trailers/4500-series-hd-for-grain-trailers, Jan. 8, 2019, 2 pages.
Areo Industries, Roll-Tarps, http://www.aeroindustries.com/products/roll-tarps/#Photos, retrieved on Jan. 8, 2019, 4 pages.
Aero Industries: Kwik Lock—Grain, http://www.youtube.com/watch?v=emRPdp_gJvQ, published Mar. 21, 2012, retrieved on Jan. 8, 2019, 1 page.
Aero Industries, Inc.: PowerLock & Kwik-Lock Grain, http://www.aeroindustries.com/products/powerlock-kwik-lock-grain/, retrieved on Jan. 8, 2019, 3 pages.
Aero Industries, The LID 2 Hydraulic Flip Tarp, http://www.aeroindustries.com/products/the-lid-2/, retrieved on Jan. 8, 2019, 3 pages.
Aero Industries, Sidekick 2 Dump Tarp System, http://www.aeroindustries.com/products/sidekick-2/, retrieved on Jan. 8, 2019, 3 pages.
Aero Industries: Kwik Lock—Grain, https://www.youtube.com/watch?v=emRPdp_gJvQ, retrieved on Jan. 8, 2019, 1 page.
Kraker Trailers—Safe Roof, https://www.youtube.com/watch?v=rZ-zN3D1-zc, retrieved on Jan. 8, 2019, 1 page.
Kraker trailers—News and product development—Opening the roof tarpaulin has never been as quick and easy, Kraker's SafeRoof 2.0 successful in practice, http://www.krakertrailers.eu/newsandproductdevelopment/?id=732, retrieved on Jan. 8, 2019, 2 pages.
Pulltarps—Semi-Automatic Tarping Systems, Truck Tarp System, http://www.pulltarps.com/pull-tarp-spring-loaded-truck-tarp-system.htm, retrieved on Jan. 8, 2019, 6 pages.
Cramaro Tarps—Cramaro Tarps Side Roll Systems, http://www.cramarotarps.com/cramaro-tarps-products/roll-systems/side-roll, retrieved on Jan. 8, 2019, 2 pages.
Agri Traders Hopper Bottom Grain Trailer Electric Tarp opener demo, https://www.youtube.com/watch?v=yHLsYUs53lg, published May 3, 2011, retrieved on Jan. 8, 2019, 1 page.
Knapen Trailers—Powersheet, http://www.knapen-trailers.eu/nieuws/new-powersheet, retrieved on Jan. 8, 2019, 4 pages.
Cup Engineering—Fliptop afdeksysteem demo Film Wielton NW33 trailer, https://www.youtube.com/watch?v=U5yVGV4Mc2k, published Mar. 26, 2012, retrieved on Jan. 8, 2019, 1 page.
Cup Engineering—Fliptop Afdeksystemen, https://cupengineering.nl/pages/sub/38224/Fliptop_.html, retrieved on Jan. 8, 2019, 4 pages.
Hyva AO kipper met Multi-kap—KWS, https://www.youtube.com/watch?v=gfs8bD-nbSM, published Nov. 20, 2012, retrieved on Jan. 8, 2019, 1 page.
Hyva—Wir bewegen Ihre Welt, We move your world, http://www.hyva.com/de/ge/multikap-ii—abdecksystem.htm, retrieved on Jan. 8, 2019, 5 pages.
Dawbarn & Sons Limited, Commercial vehicle sheeting systems, http://www.dawbarn-evertaut.com/, retrieved on Jan. 8, 2019, 2 pages.
Mountain Tarp, products, http://mountaintarp.com/products/3, retrieved on Jan. 8, 2019, 1 page.
Air Pipe, products, http://www.airpipe.at/en/products/revoplan.html#video, 1 page.
USTarp—Complete Tarping Systems, http://www.ustarp.com/#!side-dump-system/c6tk, retrieved on Jan. 8, 2019, 7 pages.
Automatisch dekzeil DEROO Constructie, https://www.youtube.com/watch?v=MVhWhggktTw, retrieved on Jan. 8, 2019, 1 page.
DEROO Constructie—Automatic cover system, http://www.derooconstructie.be/nl/productoverzicht/automatisch-afdeksysteem/, retrieved on Jan. 8, 2019, 2 pages.
VBK Covering Tarp System Powered by Roll-Rite®—European Applications 2, https://www.youtube.com/watch?v=fsOErVtRaTE, published on Dec. 17, 2015, retrieved on Jan. 8, 2019, 3 pages.
Reisch Hydraulisches Verdeck, https://www.youtube.com/watch?v=pzZ6fvEYall, published on Dec. 5, 2011, retrieved on Jan. 8, 2019, 3 pages.
Fuhrmann Fahrzeuge: Hydraulische Plane, https://www.youtube.com/watch?v=649g-NUiwa0, published on Jul. 17, 2012, retrieved on Jan. 8, 2019, 3 pages.
Timpte—Thunder Power Tarp 6000XR Series, https://store.timpte.com/product?object=9905, retrieved on Jan. 8, 2019, 3 pages.
Power Pro Tarping Systems, http://www.powerprotarpingsystems.net/index.html, 2012, retrieved on Jan. 8, 2019, 1 page.
Drakkar—Cramaro cover, https://www.youtube.com/watch?v=YggTa2SPHao, published on Oct. 21, 2014, retrieved on Jan. 8, 2019, 3 pages.

(56) References Cited

OTHER PUBLICATIONS

Hydraulic Rollover Sheet, https://www.youtube.com/watch?v=OiQCbTiA1EA, published on Nov. 9, 2015, retrieved on Jan. 8, 2019, 3 pages.
Knapen Trailers, Moving floor trailer with side doors and liftable top, https://www.youtube.com/watch?v=GVSgp4QfCTE, published on Feb. 13, 2014, retrieved on Jan. 8, 2019, 3 pages.
Fruehauf lightweight insulated smooth-sider rigid bodies, https://www.youtube.com/embed/_32bBavuK9U, retrieved on Jan. 8, 2019, 1 page.
JOSKIN—New cover, https://www.youtube.com/watch?v=vafc3ROb-VY, published on Jun. 27, 2012, retrieved on Jan. 8, 2019, 3 pages.
Agri-Cover SRT-2® Spool Roll Tarp Install: Step #7 Wrapping Cable, Mounting Ratchets and Setting Tension, https://www.youtube.com/watch?v=M17WipdXRy8, published on Nov. 25, 2008, retrieved on Jan. 8, 2019, 3 pages.
Electric Pull Tarp System Working, https://www.youtube.com/watch?v=PTpM-6v2xzM, published May 15, 2012, retrieved on Jan. 8, 2019, 3 pages.
Truck Tarp—Ultimate Aluminum Pulltarp System, https://www.youtube.com/watch?v=n_Xmf0f3lpY, published on Apr. 28, 2008, retrieved on Jan. 8, 2019, 3 pages.
Heavy Equipment Forums, Chip trucks/trailers etc., http://www.heavyequipmentforums.com/showthread.php?41588-Chip-trucks-trailers-etc, retrieved on Jan. 8, 2019, 9 pages.
Elite Transport, https://www.youtube.com/channel/UCIGIDFmp_Ej8kqGIHnP8neg, retrieved on Jan. 8, 2019, 2 pages.
Alloy Trailer—Photo Gallery, http://www.alloytrailer.com/site/gallery/, retrieved on Jan. 8, 2019, 2 pages.
Quick Draw Tarpaulin Systems, Latest News, http://www.quickdrawtarps.com/news-en.html, retrieved on Jan. 8, 2019, 10 pages.
Verduyn Tarps, Eagle Tarp Systems, http://www.verduyntarps.com/us/eagle-retractable-tarp-system/features/, retrieved on Jan. 8, 2019, 6 pages.
Aero Industries—Tarp Systems & Trailer Accessories, http://www.aeroindustries.com/, retrieved on Jan. 8, 2019, 4 pages.
Michel's Industries, Ltd., Quick Draw Tarpaulin Systems, http://www.michels.ca/product/quick_draw/quick_draw.html, retrieved on Jan. 8, 2019, 3 pages.
Tarpsavercords, https://youtu.be/V5cOelKFybU, published on Mar. 18, 2010, retrieved on Jan. 8, 2019, 3 pages.
Michel's Industriesa, Ltd., Parts Catalog, http://www.michels.ca/ckfinder/userfiles/files/SK2%20Parts%20Cat_.pdf, Apr. 13, 2015, 13 pages.
Deloupe Semi-Trailer Manufacturer, Deloupe possum belly tipper semi-trailer, http://www.deloupe.com/en/semi-trailers/forestry-products/6-possum-belly-chip-semi-trailer.php, retrieved on Jan. 8, 2019, 2 pages.
Ecotop—Automatic Sheeting System, Crane DK Articles on transport & logistics, May 27, 2016, 1 page.
Ecotop automatic hydraulic tarp solution / hydraulische Rollplane 005—2016, published on Dec. 8, 2015, https://www.youtube.com/watch?v=ZtCvYoz1rYw, retrieved on Jan. 8, 2019, 3 pages.
Kapellsystem—Hydrauliskt rullkapell, https://www.youtube.com/watch?v=kKBE-3D6OrY, published on Apr. 8, 2014, retrieved on Jan. 8, 2019, 3 pages.

* cited by examiner

TRAILER OR CONTAINER MOTORIZED COVER POWERED BY SUPERCAPACITOR

CROSS-REFERENCE TO RELATED APPLICATIONS

This application claims the benefit and priority from U.S. Provisional Patent Application No. 62/814,000 filed Mar. 5, 2019, the contents of which are incorporated herein by reference in their entirety.

FIELD OF THE INVENTION

The present invention pertains to the field of transportation and in particular to a powered cover mechanism, powered by a supercapacitor, for covering the top of a trailer or container for carrying bulk materials.

BACKGROUND

Road trailers, towed by tractor units, are used to haul a variety of materials, such as wood chips. One version of these road trailers, referred to as a road train, includes two trailers hauled behind a tractor unit; a lead trailer (nearest the tractor) and a pup trailer.

The tops of the trailers are often open to facilitate loading. Loading is typically done via a front-end loader or by driving under a hopper filled with bulk material. To unload the material, the entire road train and tractor unit can be driven onto a hydraulic tipper. This tipper then raises the road train and tractor to a steep incline. The front and rear of the pup trailer, and the rear of the lead trailer, are composed of doors that swing open. These doors are unlatched when on the tipper, and the bulk material flows through both trailers into a pit below the tipper. Other loading and unloading approaches are also possible.

Loads should be retained when driving and some bulk materials can easily blow out the top of the trailer. One common approach for load retention is to have a tarp manually drawn across the open top of each trailer before transporting chips. This is accomplished by climbing a ladder to a small platform between the trailers. Manual tarping is inherently dangerous, as the operator stands on a small platform approximately 3 meters off the ground in possibly difficult environmental conditions while attempting to draw a tarp across a heaped load. Injuries, often serious, can occur. It also takes a significant amount of time to accomplish the manual tarping and untarping of each trailer.

Mechanically assisted tarping solutions for this application are also available. In this case, a motorized mechanical means, such as an arm, draws a flexible cover over the open top of the trailer to cover the load, and operates in the opposite direction to uncover the load. However, providing such a mechanical solution, along with an appropriate power source that satisfies performance, weight and reliability requirements is challenging.

Therefore there is a need for a powered trailer or container covering mechanism and power source that is not subject to one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a powered trailer or container covering mechanism and power source provided as a supercapacitor which is also used herein to refer to as ultracapacitor.

In accordance with embodiments of the present invention, there is provided an apparatus for covering an open top of a transportation trailer container, the apparatus comprising: a cover movable between a closed position in which the cover is disposed over the open top and an open position in which the open top is exposed; an electrically powered covering mechanism configured to move the cover between the closed position and the open position; and a supercapacitor mounted to the transportation trailer container or a trailer associated with same, the supercapacitor controllably coupled to the electrically powered motor or actuator for providing power thereto. The covering mechanism can include an electrically powered motor or actuator (e.g. linear actuator), an electrically powered hydraulic or pneumatic pump or compressor operatively coupled to a hydraulic or pneumatic motor or actuator (e.g. piston), or another means for moving the covering mechanism which relies directly or indirectly on electrical power from the supercapacitor.

The covering mechanism can include a winch, such as a winch comprising an electrically powered motor. The winch can be the primary actuator or it may be provided as an electrically operated backup actuator.

In some embodiments, a charging control circuit is provided for operative coupling to a source of electrical power which is external to the trailer, the charging control circuit configured to: monitor current drawn from the source of electrical power to supply one or more loads other than the supercapacitor; and switchably make, break, or both make and break, a connection between the source of electrical power and the supercapacitor based on an amount of the monitored current. In some embodiments, when the current is below a predetermined threshold, the charging control circuit connects the source of electrical power to the supercapacitor, and when the current is above a predetermined threshold, the charging control circuit disconnects the source of electrical power from the supercapacitor. In some embodiments, when the current is below the predetermined threshold, the charging control circuit connects the source of electrical power to the supercapacitor, and the source of electrical power is otherwise normally disconnected to the supercapacitor. In some embodiments, when the current is above the predetermined threshold, the charging control circuit disconnects the source of electrical power from the supercapacitor, and the source of electrical power is otherwise normally connected to the supercapacitor.

In accordance with embodiments of the present invention, there is provided a road transportation trailer comprising the above-described apparatus.

In accordance with embodiments of the present invention, there is provided a method for operating a covering mechanism for covering an open top of a transportation trailer container, the method comprising: charging a supercapacitor mounted to the transportation trailer container or a trailer associated with same; and using charge stored in the supercapacitor to operate an electrically powered covering mechanism, for example by operating a motor, actuator, pump or compressor thereof.

In some embodiments, charging the supercapacitor comprises: coupling a charging control circuit to a source of electrical power which is external to the trailer;

monitoring current drawn from the source of electrical power to supply one or more loads other than the supercapacitor; and switchably making, breaking, or both making and breaking, a connection between the source of electrical power and the supercapacitor based on an amount of the monitored current.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
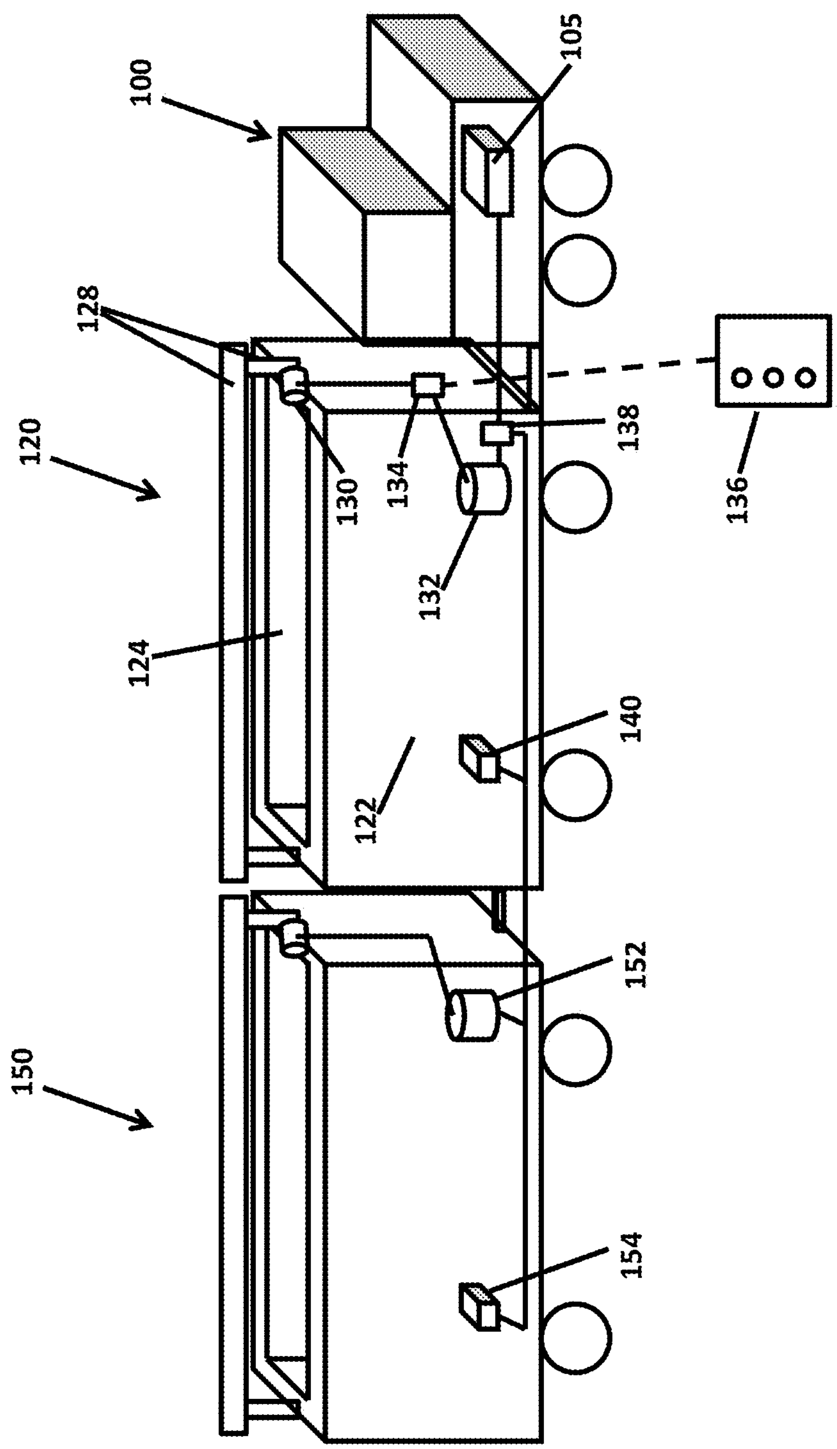
FIG. 1 illustrates a road tractor-trailer combination provided according to an embodiment of the present invention.

Embodiments of the present invention provide an apparatus for automatically deploying and retracting a flexible cover over an open top of a transportation trailer container. The container can carry bulk material such as wood chips, and, in various embodiments, the flexible cover can be used over heaped loads. The apparatus may allow for deployment and retraction of the cover by remote control, without requiring an operator to climb to the container top or work at heights. The cover may be unrolled from and rolled onto a rotating cylindrical roller, for deployment and retraction, respectively. The apparatus can include a supercapacitor as a power source. The supercapacitor can be charged as needed by a source of electricity coupled to the trailer, for example as provided by a road tractor or other towing machine. The apparatus can include a charging circuit which charges the supercapacitor while avoiding overloading of the power source.

It has been recognized by the inventors that an on-board electrical power source is beneficial for powering the trailer covering mechanism. This reduces reliance on an external power source such as a road tractor, and also reduces the possibility of overtaxing the road tractor by drawing large amounts of power for short periods of time. By using an on-board power source, the trailer covering mechanism can be operated even when the road tractor's engine is off or the trailer is uncoupled. Furthermore, the power available for operating the mechanism is not limited to the power instantaneously available from the external source. Instead, power availability depends on the capabilities of the on-board power source, which accumulates energy for potential release at a given power level.

It has further been recognized by the inventors that a traditional (e.g. lead-acid) battery, located on-board the trailer, is not necessarily ideal for powering the trailer covering mechanism. The trailer covering mechanism is characterized in that it tends to draw a large amount of power over a short period of time, and is typically operated intermittently. Powering the mechanism using a smaller battery will result in deep charge/discharge cycling which shortens the life of the battery. Powering the mechanism using a larger battery mitigates this problem, but introduces additional weight and cost to the trailer. Batteries are typically heavy in terms of weight per unit of power supplied, which can result in significant costs for a trailer being towed over long distances. Additionally, battery performance can be insufficient in cold temperatures. Furthermore, the charging rate for a battery can be lower than the average rate at which power is needed to operate the trailer covering mechanism. This can lead to performance limitations and logistical problems if the trailer cover cannot be operated when needed due to lack of battery charge.

To overcome these problems, it is proposed by the inventors to use a supercapacitor, located on-board the trailer, to power the trailer covering mechanism. The supercapacitor exhibits characteristics, such as high power-to-weight ratio, high charging rates, performance vs. temperature, and power delivery capacity, that are particularly appropriate to the requirements of powering the trailer covering mechanism. Although supercapacitors are typically only recommended for applications with much shorter-term energy storage requirements, it has been recognized by the inventors that they are also beneficial in the present application of powering trailer covering mechanisms in particular.

In comparison to typical batteries, supercapacitors exhibit a significantly faster charge time, longer lifetime measured in both service life (years) and number of charge/discharge cycles, and a significantly higher power output capability per unit weight. Supercapacitors also operate at colder temperatures. These characteristics can be advantageous in the present application.

Additionally, in various embodiments, the typical limitations of at least some supercapacitors, such as low specific energy, a voltage that decreases linearly with capacitor charge, a relatively high self-discharge rate, and a higher cost, can be adequately managed or accommodated. For example, the higher cost can be offset by the other operating benefits. The high self-discharge rate is still sufficiently low given normal operating conditions of the trailer, including intervals between charging opportunities. The trailer covering mechanism itself can be made tolerant to low voltage conditions, for example by using a dc motor that simply reduces in speed at some (but not necessarily all) lower voltages, or by employing a conversion circuit to maintain a constant voltage by drawing increasing amounts of current from the supercapacitor.

Embodiments of the present invention provide a method and apparatus for securely covering the load or loading area of a tractor trailer, container, or similar structure using a covering mechanism and one or more high-capacity capacitors (commonly known as a supercapacitors or ultracapacitors) as the power source for the covering mechanism. The one or more supercapacitors provide electrical power to cover and/or uncover the load with a tarp, screen, or similar construct. This mitigates the need to manually cover the load while using a power source that is particularly suitable for the application. Due to the particular properties of a supercapacitor, the covering mechanism's motor or actuator is able to draw high amperage over a short operating duration, while quickly recharging from a tractor or other available power source when the operation is complete. Temperature has limited effect on the performance of the supercapacitor compared to a battery. The lifespan of a supercapacitor in such operating conditions is expected to exceed that of a battery. The weight of a supercapacitor is also less than a comparable battery.

In some embodiments, multiple trailers are each equipped with a covering mechanism having an electrical motor, and a supercapacitor is located near the electrical motor. Each supercapacitor is equipped with a charging system to protect it from incorrect, potentially damaging, current, voltage, or polarity.

The charging circuit may draw power from the antilock braking system (ABS) or auxiliary wire of a trailer hitch power interconnect, which receives power from the tractor electrical system, or from a substitute electrical system for example installed in a garage or building site. In many implementations, the auxiliary wire is also designated as the ABS power wire.

In some embodiments, the charging circuit includes a current-sensing switch configured to prevent the supercapacitor from charging when power is being drawn, by downstream devices, for other purposes. This causes the supercapacitor to be charged only when the power source is not being drawn upon for other purposes in the trailer or in another trailer being fed power via the trailer. For example, a tractor may charge the supercapacitor during travel using the ABS/auxiliary wire of a standard heavy duty trailer power interconnect. However, when the trailer's ABS is activated and drawing current, or when another device is drawing current, the switch senses the current draw and operates to inhibit supercapacitor charging. As a result, potentially dangerous situations in which the ABS system is insufficiently powered during transport (due to supercapacitor charging), leading to possible braking issues, are avoided. Furthermore, potential overloading of the power source is inhibited.

In some embodiments, the charging circuit includes a power input for connecting to a source of power, a power output for connecting to other devices such as the trailer's ABS system or further trailers in a road train. In further embodiments the charging circuit also includes a charging control circuit, such as a current sensing switch. The current sensing switch monitors the amount of current being drawn at the power output and switches to inhibit charging of the supercapacitor when this monitored amount of current exceeds a predetermined threshold. When the monitored amount of current falls below the same threshold or another threshold, the switch operates again to allow charging of the supercapacitor.

In some embodiments, a relay and control system is used to controllably supply an electric motor with power from the supercapacitor. The control system can be operated to selectably apply and interrupt power to the motor at appropriate times to start and stop the motor. The control system can be operated to apply power to the motor at a selected polarity, as appropriate to operate the motor in forward or reverse.

In some embodiments, the electric motor winds or unwinds a cable which extends or retracts a spring-loaded tarp (or other flexible cover). This tarp rolls across the load or the top of the trailer and locks itself into place on either side of the trailer at the limits of travel. The direction and actuation of the motor/tarp can be controlled using a wired switch, wireless remote control, or other method. In this example configuration the tarps would be able to cycle approximately four times before charging is required. Charging the supercapacitor enough for a single cycle may take as little as three minutes. Charging a single supercapacitor from empty to full may take approximately 15 minutes. It is contemplated that the electric motor can be integrated with other mechanisms to cover or uncover a trailer or container open top with a flexible cover such as a tarp.

In some embodiments, the supercapacitor is charged from the charging system onboard the attached tractor.

In some embodiments, the supercapacitor is charged using the ABS/auxiliary wire or other wire included in a standard interconnect between the tractor and a trailer.

In some embodiments the supercapacitor is charged using a wire independent from other wiring on the trailer.

In some embodiments the covering mechanism comprises a mechanically operated linear actuators which pivots an arm. Pivoting of the arm in one direction results in drawing a cover overtop of the trailer, while pivoting of the arm in the opposite direction results in removing the cover.

In some embodiments the covering mechanism includes an electric motor configured to wind or unwind a cable. The cable in turn is used to drive covering or uncovering of the trailer or container, for example by moving a pivoting arm. The covering mechanism can include an electrically powered winch, for example.

In some embodiments the covering mechanism comprises a pneumatic or hydraulic actuator, such as a piston or other device. The covering mechanism further includes an electrically powered source of hydraulic or pneumatic pressure, such as a pump or compressor. The pump or compressor can directly drive the pneumatic or hydraulic actuator, or it can pressurize or charge a fluid reservoir (such as an oil or air tank) which is used to drive the actuator. This electrically powered source of pressure is powered by the supercapacitor. As such, electricity from the supercapacitor can be used to directly drive the covering mechanism by operating an electric motor or actuator, or electricity from the supercapacitor can be used to indirectly drive the covering mechanism by operating an electric device which in turn operates a non-electric motor or actuator.

In some embodiments the system includes one or more current sensing switches (or other charging control circuit) to prevent the charging of the supercapacitor from interfering with other operations on the trailer.

In some embodiments the system is controlled using a wired controller or switch.

A wired controller or switch can be considered remote for example if it is capable of being located at a distance from the system via a sufficiently long control cable.

In some embodiments the system is controlled wirelessly using a remote controller.

In some embodiments the cover is a tarp, screen, aluminum sheeting, or other material to cover the load.

In some embodiments the system is installed on a container rather than a trailer. The container may be mountable on a trailer or used for another purpose.

FIG. 1 illustrates a road tractor-trailer combination provided according to an embodiment of the present invention. The combination includes a road tractor 100, a lead trailer 120 and a pup trailer 150. The lead and pup trailers can each be used to carry a bulk material such as wood chips. A pup trailer is not necessarily included in all embodiments. The trailers of FIG. 1 can alternatively be used to carry other bulk materials.

The road tractor 100 includes an electrical power source 105, typically a battery which is charged by an engine via an alternator, but which can also be a battery of an electric vehicle. The power source 105 is coupled to the lead trailer 120, for example via power ground pins of a standard pluggable 7-way tractor-trailer electrical interconnect.

The lead trailer 120 includes a bulk material carrying container 122 having an open top 124, a cover movable between a closed position in which the cover is disposed over the open top and an open position in which the open top is exposed, and a covering mechanism 128 configured to move the cover between the closed position and the open position. The covering mechanism includes an electrically powered motor 130, which may be a DC (or possibly AC) rotary motor or another actuator such as a linear actuator.

A supercapacitor 132 is mounted on the lead trailer 120 or its container 122, and is coupled to the motor 130 or actuator. A control system 134 is provided for controllably applying power from the supercapacitor to the motor 130, for example at selected times and with selected polarity, in order to operate the motor 130 in the forward or reverse direction. The control system 134 is operated by a manual control 136, which can be coupled to the control system 134 via wired or wireless radio connection.

The supercapacitor 132 is coupled to the electrical power source 105 for charging of the supercapacitor. A charging control system 138 may be provided which controls when power from the power source 105 is made available for charging the supercapacitor. For example, the charging control system 138 may connect the power source to the supercapacitor when a determination is made that sufficient current is available from the power source 105 for charging of the supercapacitor 132.

The power source 105 may be further connected to additional electrical loads, either on board the lead trailer 120 or off of the lead trailer. For example, electrical load 140, on board the lead trailer, may be an ABS unit or other unit. Electrical loads on the pup trailer 150 may include a supercapacitor 152 and another load 154 such as an ABS unit or other unit. The supercapacitor 152 of the pup trailer may similarly be used to power a covering mechanism having an electrically powered motor or actuator. The charging control system 138 may monitor current drawn by the additional electrical loads, and inhibit power supply for charging the supercapacitor 132 when this monitored current exceeds a predetermined threshold.

Figure 2:
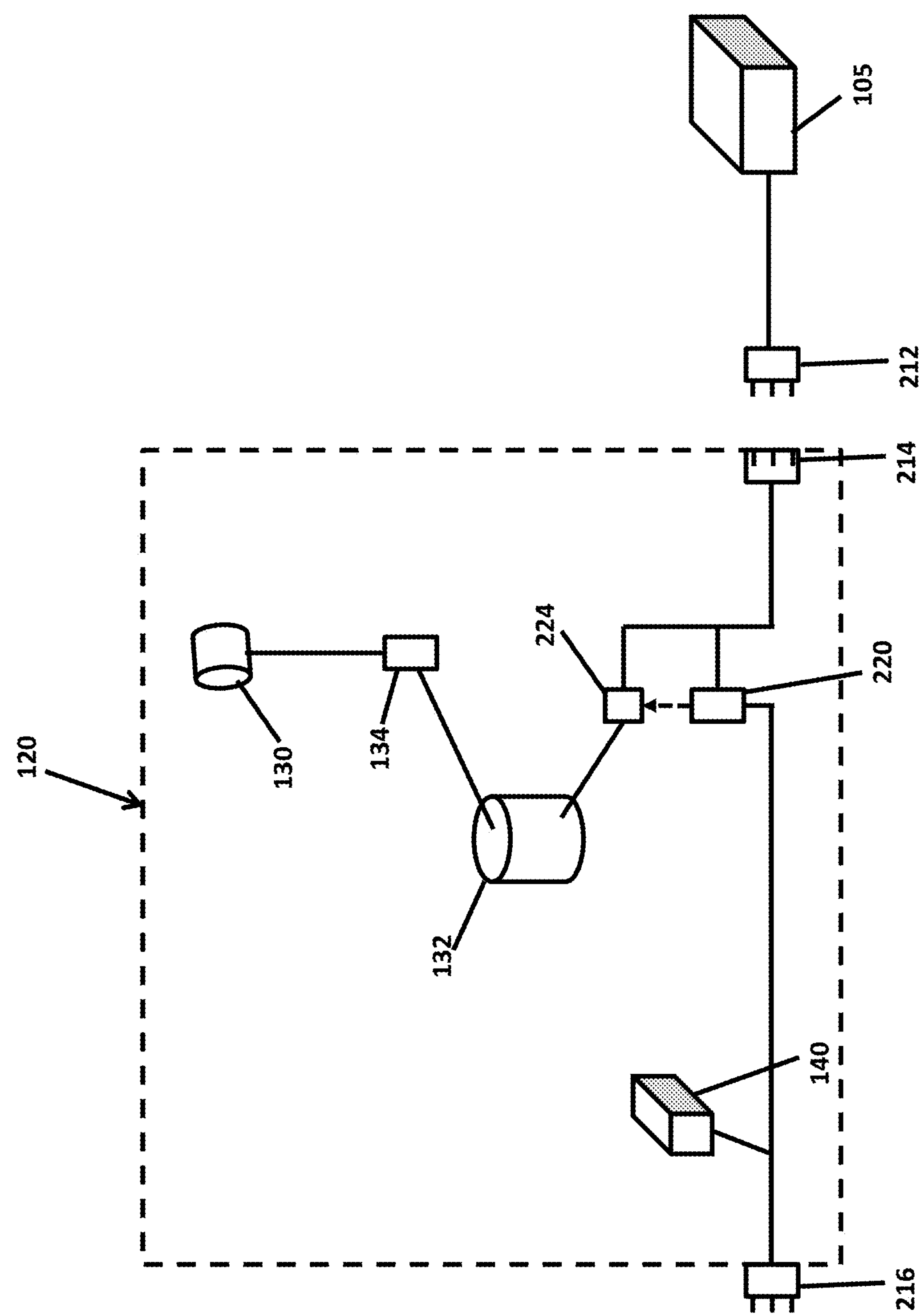
FIG. 2 schematically illustrates the electrical components of FIG. 1.

FIG. 2 schematically illustrates the electrical components of FIG. 1, for the lead trailer 120 and road tractor 100. Mating electrical interconnects 210, 212, 214 for coupling the power source 105 with the lead trailer, and for coupling the lead trailer with a pup trailer are also shown. The charging control system 138 is illustrated as including a current monitor 220 and a switch 224, such as an electrically controlled relay. When the current monitor 220 measures current, being drawn by the additional electrical loads, rising above a threshold value, it sends a signal to the switch 224, causing the switch to open. When the current monitor 220 measures the current, drawn by the additional electrical loads, rising falling below the threshold value, it sends a signal to the switch 224, causing the switch to close.

Figure 3:
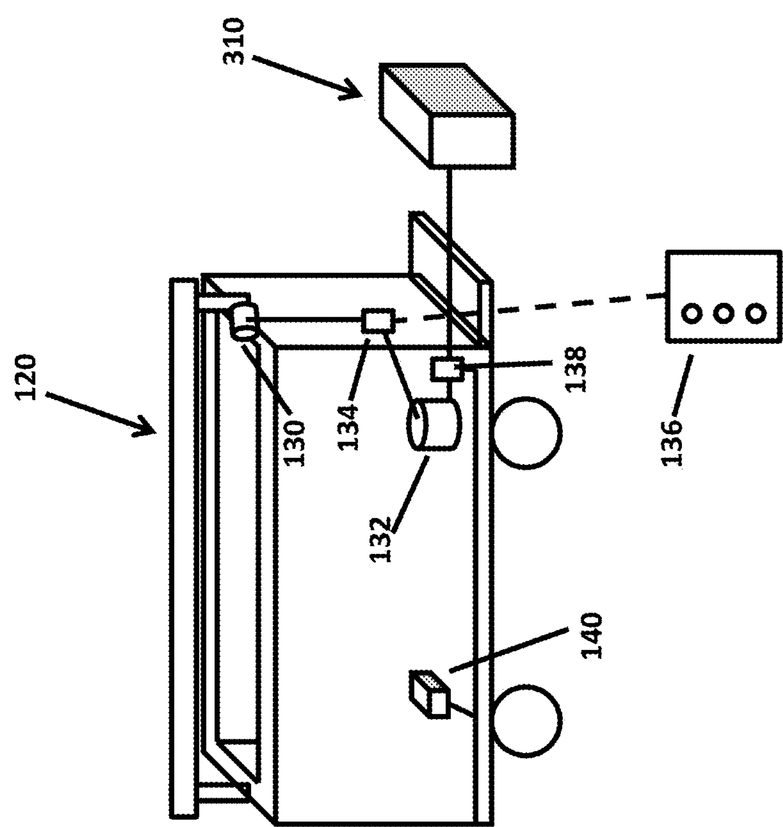
FIG. 3 illustrates the lead trailer of FIG. 1 in an alternative configuration, being powered by a different power source.

FIG. 3 illustrates the lead trailer 120 in an alternative configuration, being powered by a different power source 310. The trailer can be stationary at a loading or unloading site for example. The power source 310 can be a generator or an AC mains power source (possibly with AC/DC converter).

Figure 4:
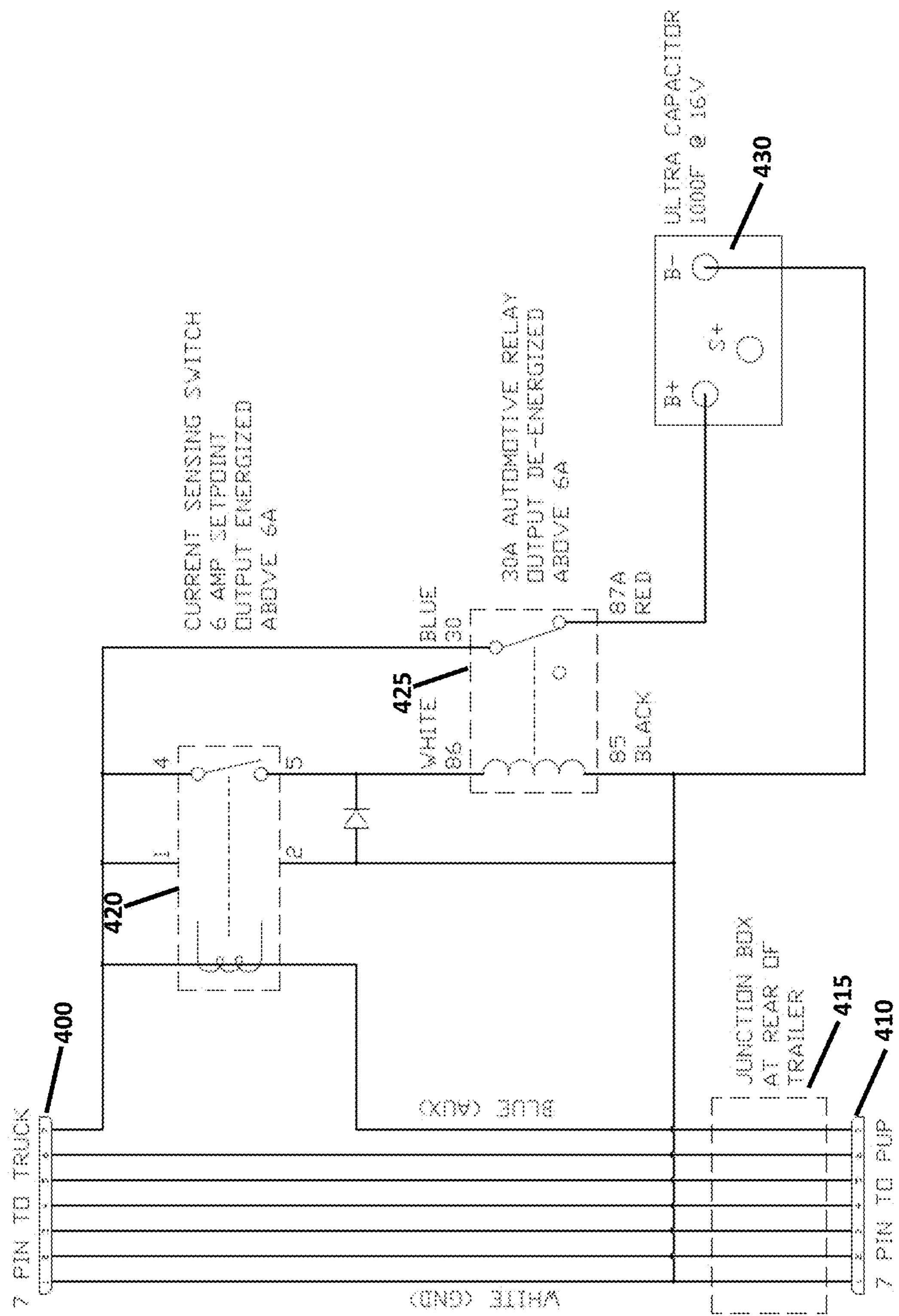
FIG. 4 schematically illustrates a supercapacitor, charging control system, and electrical interconnect of a trailer according to an embodiment of the present invention.

FIG. 4 schematically illustrates a supercapacitor, charging control system, and electrical interconnect of a trailer according to an example embodiment of the present invention. Numerical values such as amperages, capacitances and voltages are provided by way of example only and can be varied. A 7-pin electrical interconnect 400 is provided at the front of the trailer for connecting the trailer system to a power source, e.g. of a road tractor/truck. A similar interconnect 410 may be provided at the rear of the trailer, for daisy chain connection to a further trailer. A junction box 415 is also provided, which may supply power to the interconnect 410 as well as other on-board loads of the trailer, such as an ABS system. As shown, and by way of example, ground and auxiliary power lines from the connector are used to operate the charging control system and supercapacitor 430. A current sensing switch 420 monitors current drawn from the power source toward the junction box 415 and interconnect 410, via which additional loads are powered. By way of example, the switch 420 is a normally open switch having a threshold set point of 6 Amps. When the monitored current is above 6 Amps, the switch 420 is energized (closed), while when the monitored current is below 6 Amps, the switch 420 is de-energized (open). The current sensing switch 420 is used to operate a charging control switch 425, which is a normally closed switch coupled between the power source and a positive terminal of the supercapacitor 430. When the current sensing switch 420 is closed, it energizes the charging control switch 425, causing it to open. When the current sensing switch 420 is open, it de-energizes the charging control switch 425, causing it to close. As such, power supplied for charging the supercapacitor 430 is provided when the current drawn toward the junction box 415 and interconnect 410 is below 6 Amps, and is interrupted otherwise.

The above configuration provides one way in which the charging control circuit can switchably make, break, or both make and break, a connection between the source of electrical power and the supercapacitor based on an amount of monitored current. The charging control circuit can open a normally closed switch to break the connection, i.e. to disconnect the source of electrical power from the supercapacitor when the monitored current (flowing to other devices) exceeds a threshold. The charging control circuit can open a normally open switch to make the connection, i.e. to connect the source of electrical power to the supercapacitor when the monitored current (flowing to other devices) is below a threshold. The charging control circuit operates to both make and break the connection.

Figure 5:
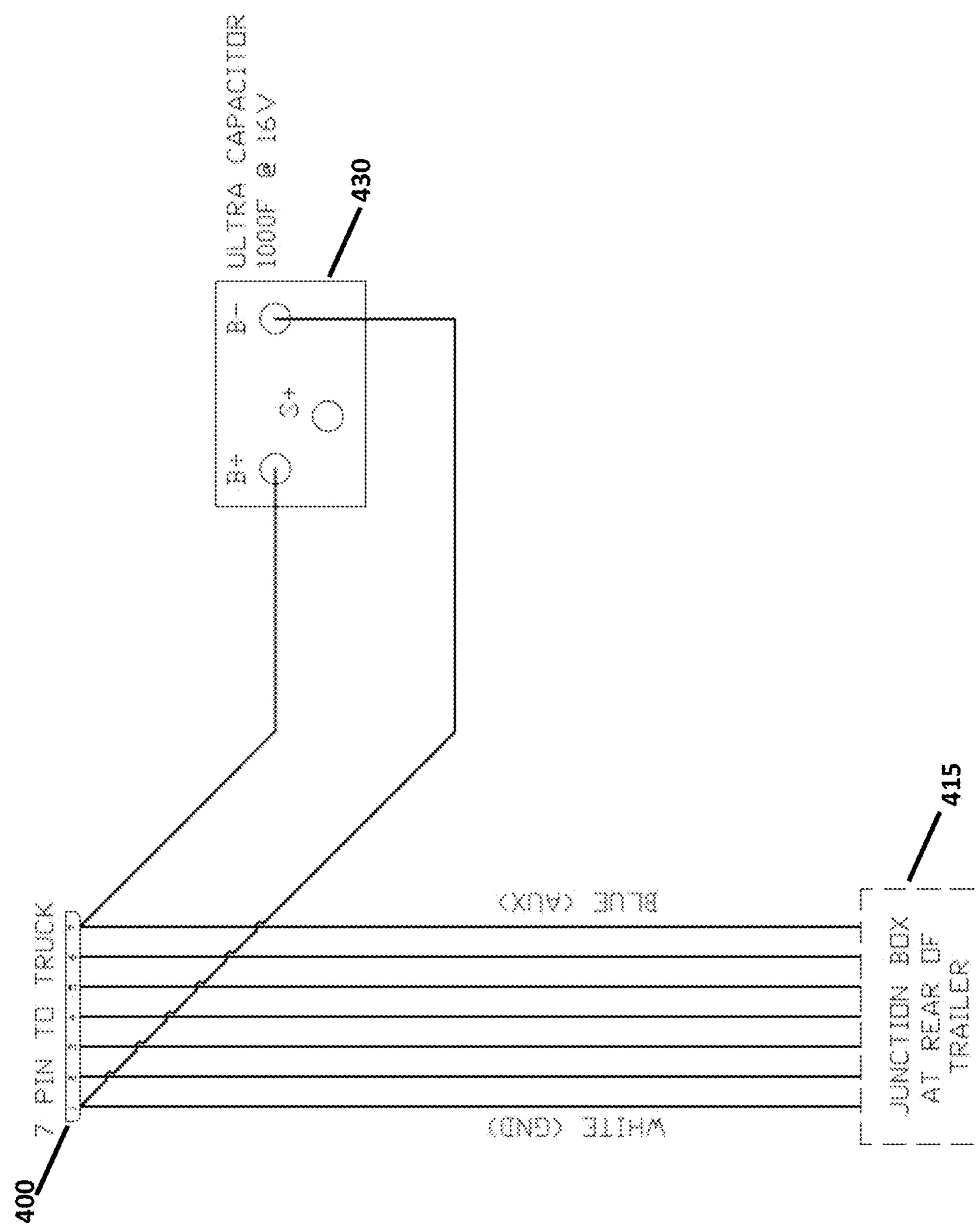
FIG. 5 schematically illustrates an alternative embodiment electrical interconnection, without a charging control system.

FIG. 5 schematically illustrates an alternative embodiment, without a charging control system. In this embodiment, the supercapacitor 430 is connected directly to the auxiliary power and ground pins of a 7-pin electrical interconnect 400. As such, uninterrupted charging of the supercapacitor may be provided. A junction box 415 or other load may also be coupled to the interconnect 500. When the supercapacitor approaches full charge, it may inherently draw less current from the supply source. As such, potential impact on other loads due to supercapacitor charging can be limited to a short period of time corresponding to initial charging.

Figure 6:
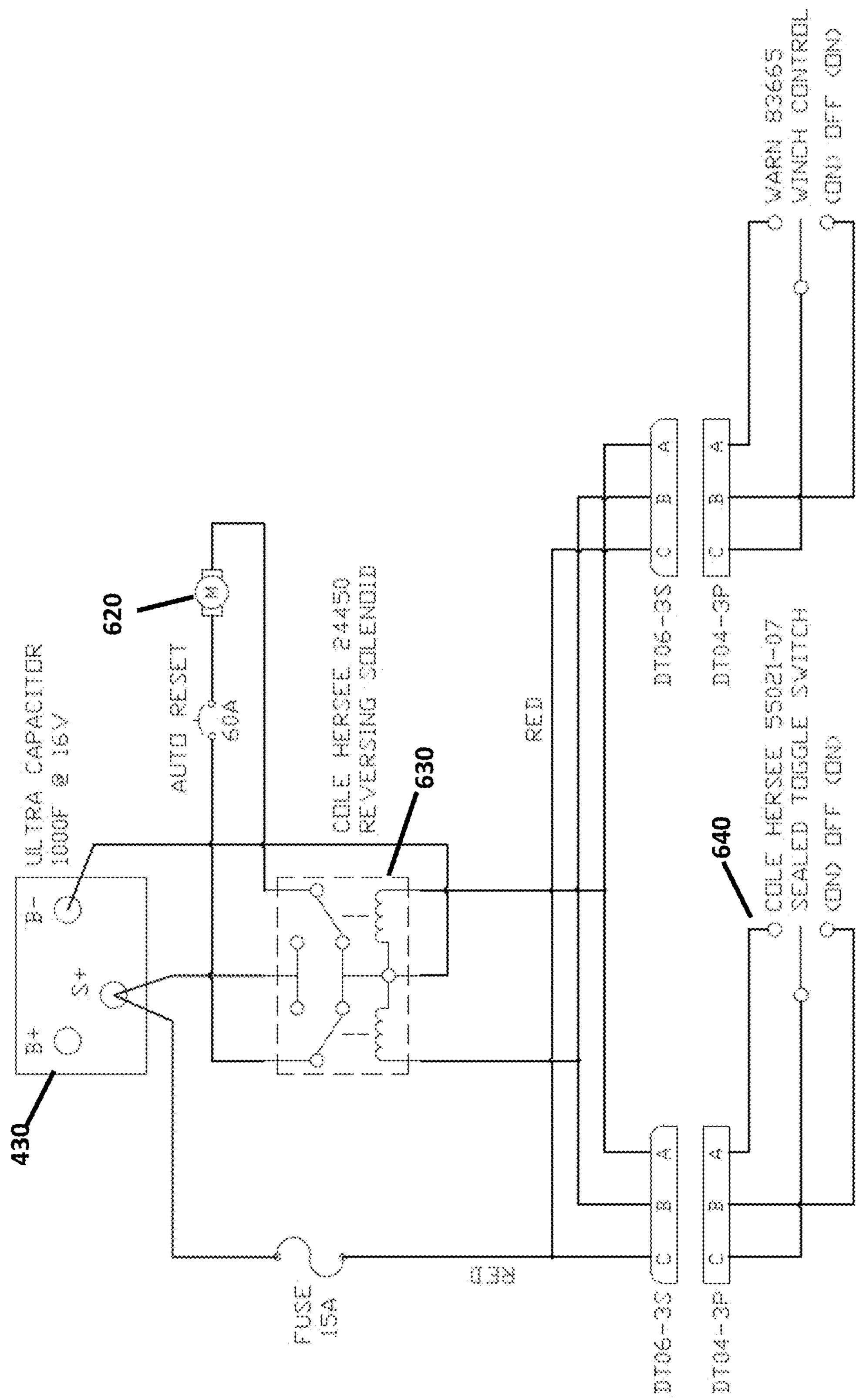
FIG. 6 schematically illustrates a control system for controllably operating the container covering mechanism, according to an embodiment of the present invention.

FIG. 6 schematically illustrates a control system for controllably operating the container covering mechanism, according to an embodiment of the present invention. Power and ground terminals of the supercapacitor 430 are controllably coupled to the two terminals of a DC motor 620 via a reversing solenoid switch 630. The reversing solenoid is controlled by a toggle switch 640.

When the toggle switch is in an "OFF" position, the solenoid 630 is operated to interrupt the electrical circuit between the supercapacitor 430 and the motor 620, thus causing the motor to not move. When the toggle switch is in a "CLOSE" position, the solenoid 630 is operated to complete the electrical circuit between the supercapacitor 430 and the motor 620 with a first polarity, thus causing the motor to move in a first direction which causes the covering mechanism to draw a cover overtop of the container. In the first polarity, the first power terminal of the motor is connected to a first one of a positive and negative terminal of the supercapacitor, and the second power terminal of the motor is connected to the other of the positive and negative terminal of the supercapacitor. When the toggle switch is in an "OPEN" position, the solenoid 630 is operated to complete the electrical circuit between the supercapacitor 430 and the motor 620 with a second polarity, thus causing the motor to move opposite to the first direction, causing the covering mechanism to remove the cover from overtop of the container. In the second polarity, which is opposite from the first polarity, the second power terminal of the motor is connected to the aforesaid first one of a positive and negative terminal of the supercapacitor, and the first power terminal of the motor is connected to the aforesaid other of the positive and negative terminal of the supercapacitor.

Figure 7:
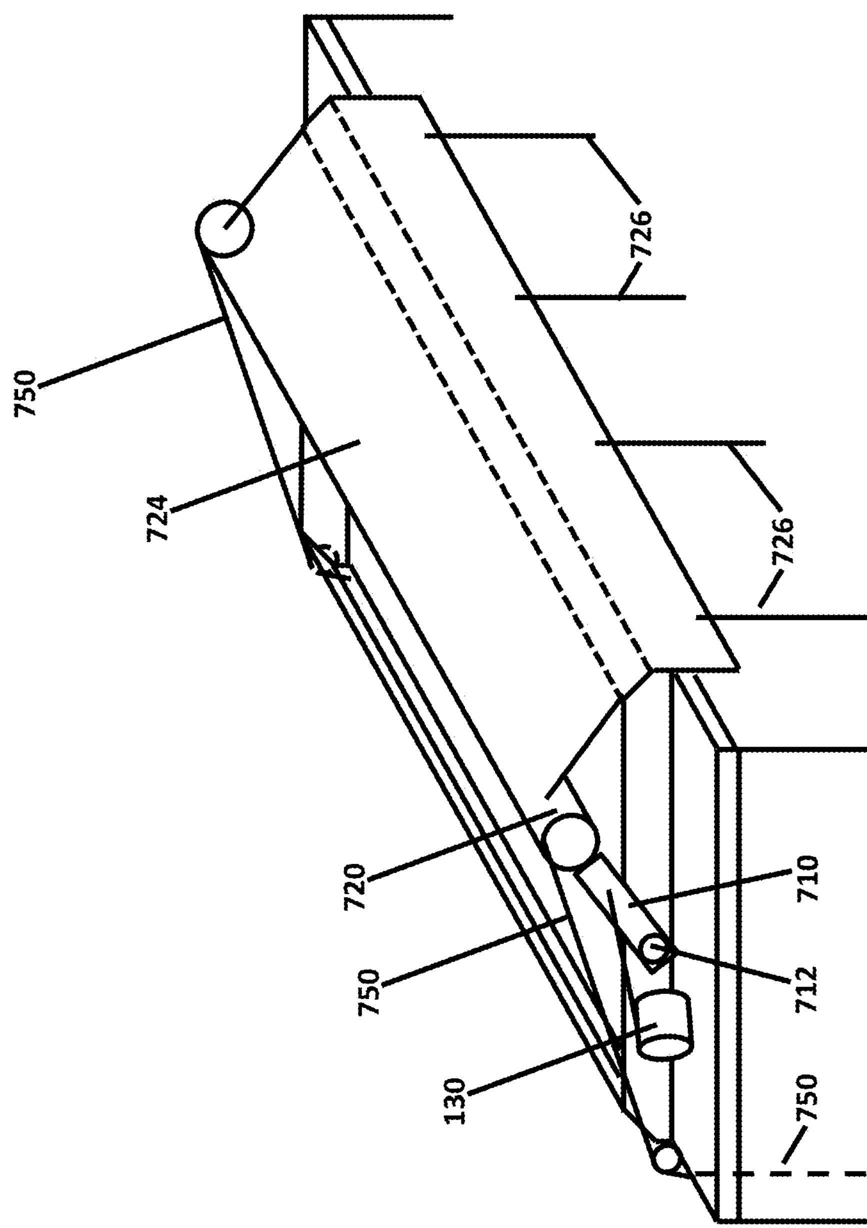
FIG. 7 illustrates a covering mechanism provided according to an embodiment of the present invention.

FIG. 7 illustrates a covering mechanism provided according to an embodiment of the present invention. It should be understood that the illustrated covering mechanism is provided as an example and can be varied in many ways. The covering mechanism used for covering an open top of a transportation trailer container. The covering mechanism includes an electric motor 130 which powers an arm 710, causing the arm to pivot. The electric motor can alternatively be replaced with a hydraulic or pneumatic actuator. The arm 710 is pivotable between a closed position, in which an end of the arm is located on a first side of the container open top, and an open position, in which the end of the arm is located on a second, opposite side of the container open top. The arm is pivotably mounted to the container at a pivot point location 712. Matching and cooperating arms can be provided at both the front and the back ends of the frame. In the illustrated embodiment, the arm pivots from side to side rather than from front to back.

The arm holds (or the arms hold) a rotatable roller 720 for dispensing and receiving a flexible cover 724. The flexible cover is wrapped around the roller when the arm is in the open position, and is unrolled from the roller to cover the container due to motion of the arm from the open position to the closed position. As such, when the arm is in the open position, the container is uncovered, while when the arm is in the closed position the container is covered.

Rotation of the roller in one direction is accomplished by tensile force exerted by the flexible cover on the roller when the arms are moved away from the side of the container to which the flexible cover 724 is anchored using anchoring bodies 726. The anchoring bodies 726 may be cables, or resilient elastic bodies, for example. This rotation also causes cables 750 at either end of the roller to be wrapped up on the roller or associated coaxial spools, and the cover to become unwrapped, covering the load. When the arm travels in the opposite direction, the tension in the cables 750 causes the roller to rotate in the opposite direction, so that the flexible cover is taken up by the roller. The cables are also anchored to the container either directly or via another resilient elastic anchoring body.

In an alternative embodiment, another mechanism can be used to move the arm between the closed and open positions. For example, a rotating motor can be provided between the arm and the roller, such that rotation of the motor in one direction causes the roller to take up the flexible cover, thereby drawing the arm toward the open position. Rotation of the motor in the opposite direction causes the roller to let out the flexible cover and also causes a spool, which is coaxial with the roller, to take up a cable which is anchored on the opposite side of the container as the flexible cover, thereby drawing the arm toward the closed position.

Figure 8:
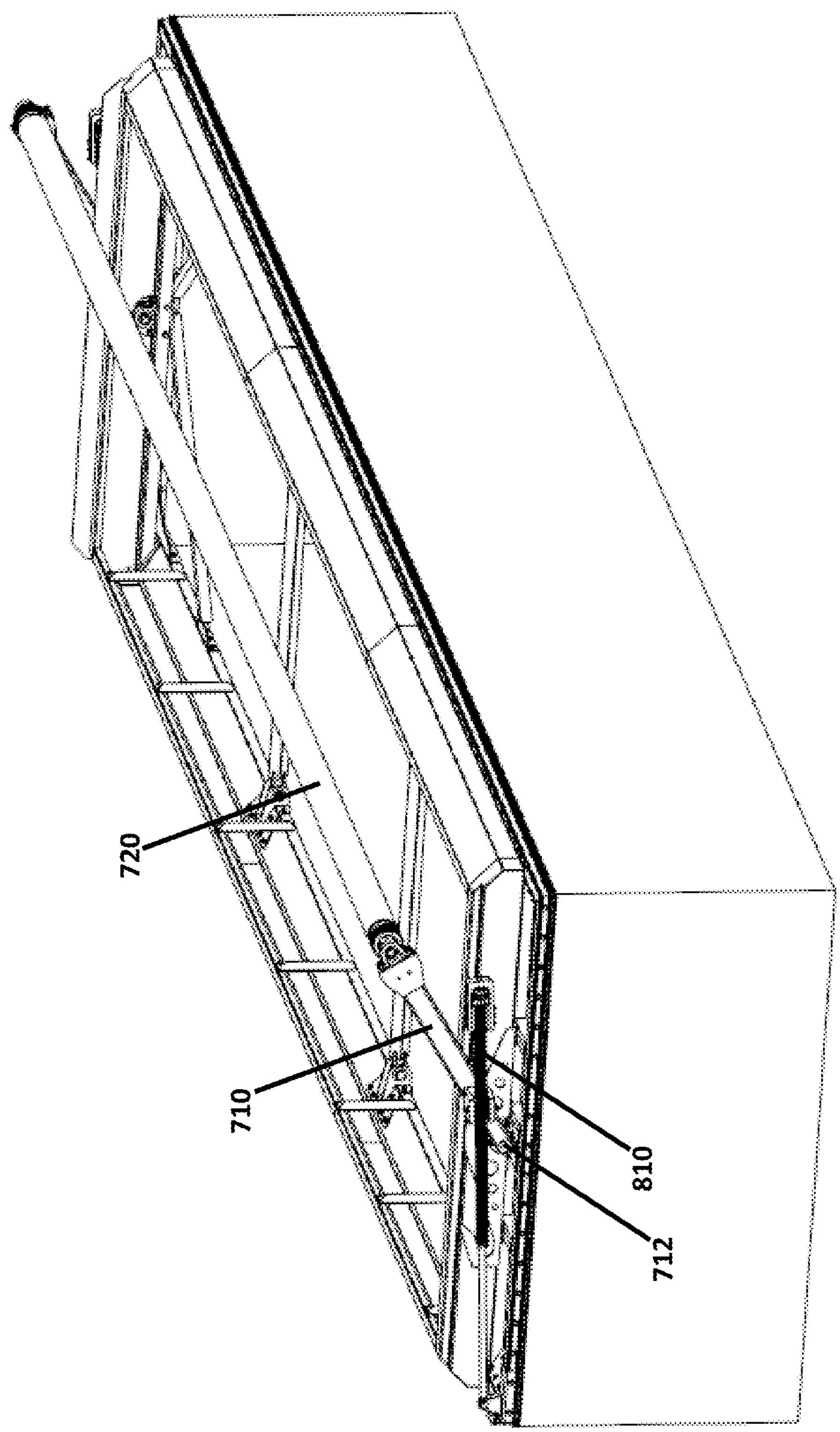
FIG. 8 illustrates aspects of a covering mechanism according to another embodiment of the present invention.

FIG. 8 illustrates aspects of a covering mechanism according to another embodiment of the present invention. The flexible cover is omitted for clarity. In this embodiment, a pivotable arm 710 supporting a roller 720 is used to draw or remove the flexible cover from the container open top, similarly to FIG. 7. In FIG. 8, an electrically powered linear actuator 810 (powered by a supercapacitor) is used to operate the arm. By extending the actuator 810, the arm 710 is forced to pivot toward one side of the container, and by retracting the actuator 810, the arm 710 is forced to pivot toward the opposite side of the container.

Figure 9:
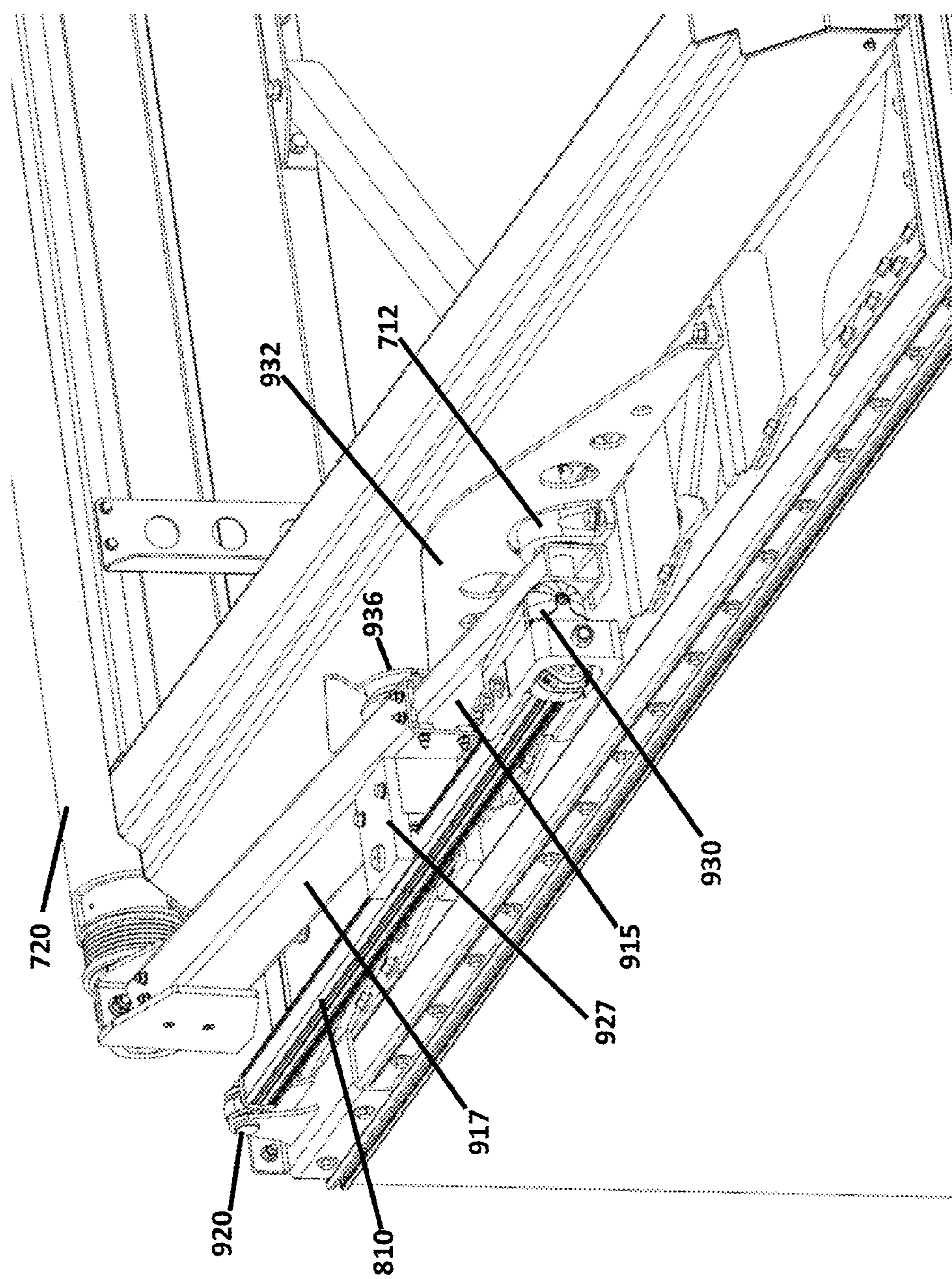
FIG. 9 illustrates a close-up view of the portions of FIG. 8.

FIG. 9 illustrates a close-up view of the covering mechanism and linear actuator 810 of FIG. 8. The pivotable arm 710 of FIGS. 7 and 8 is illustrated in FIG. 9 as having two portions 915, 917. The pivotable arm is mounted on an arm pivot 712, which is mounted to a frame and which is pivotably coupled to a proximal end of the arm, for example by a trunnion or bearing mechanism. The linear actuator 810 is coupled at a first part to the frame via a pivot 920. A second part of the actuator 810 (which may be a motorized telescoping rod) is pivotably connected to the arm using a pivot block 927. The pivot block 927 is connected to the arm portion 917 away from the arm pivot 712. The actuator 810 may be a linear actuator, which comprises a straight section that is variable in length. In the presently illustrated embodiment, a motor 930 suspended at a non-anchored end of the arm actuator acts to vary the length of the arm actuator. By extending the arm actuator 325 the arm 315, 317 can be made to pivot away from the arm actuator pivot 320; by retracting the arm actuator the arm can be made to pivot in the opposite direction.

In one embodiment, the arm actuator is mounted via a rod eye to the pivot block 927, and is also mounted to a trunnion 920. The trunnion is pivotable in a vertical plane, and may include a second swivel that allows horizontal rotation once it attaches to the arm 915, 917. By allowing the trunnion to pivot in two directions, side forces and bending moments can be inhibited from damaging an actuator which is only intended to encounter axial forces. The movement of the actuator drives the angular movement of the arm. The angular movement can also cause telescopically varying length of the arm, as will be described below.

In some embodiments, and with reference again to FIG. 9, the arm is a telescoping arm, having a lower arm portion 915 coupled to the arm pivot (base) and an upper arm portion 917 coupled to the roller 720 and a support roller 936. The upper arm portion 917 is also coupled to the actuator 810 through a pivot and double trunnion of the pivot block 927. The lower arm portion and the upper arm portion are relatively movable to provide a telescopically variable length of the arm. The support roller 936 rests on a ramp 932, which is located and shaped to vary length of the arm according to a predetermined profile as the arm pivots between the open position and the closed position and the support roller 936 is correspondingly forced to vary its path by the presence of the ramp 932. In some embodiments, use of a telescoping arm can facilitate the ability of the cover to clear heaped loads. Additionally or alternatively, use of a telescoping arm can reduce the amount of pivot force associated with pivoting of the arm, by lowering the moment arm from the roller. Additionally or alternatively, use of a telescoping arm can allow for a shorter arm length, thereby lowering wind sail effects.

In some embodiments, the support roller 936 and ramp 932 are configured to support the arm during its pivoting motion and also to assist in arm pivoting. For example, the ramp may assist in reducing the amount of force required to pivot the arm on an upward trajectory. This facilitates an efficient arm pivot between fully open and fully closed positions, in terms of force required to pivot the arm. When used with a telescoping arm, the shape of the ramp facilitates extension of the arm so that its outer end (at which the roller is located) reaches the edge of the trailer when in the fully open and fully closed positions. Furthermore, the ramp may facilitate an efficient arm rotation.

The charging control circuit may additionally or alternatively include other features. For example, the charging control circuit may limit the amount of current provided at a given time for charging the supercapacitor, based on one or a combination of factors such as a schedule, an indication of current or anticipated demand of various loads including the covering mechanism and other loads, or a current charge level of the supercapacitor. Various algorithms or rule sets can be used to allocate different amounts of power for charging the supercapacitor at different times, based on one or a combination of factors.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. An apparatus for covering an open top of a transportation trailer container, the apparatus comprising:
- a cover movable between a closed position in which the cover is disposed over the open top and an open position in which the open top is exposed;
- an electrically powered covering mechanism configured to move the cover between the closed position and the open position;
- a supercapacitor mounted to the transportation trailer container or a trailer associated with same, the supercapacitor controllably coupled to the electrically powered covering mechanism for providing power thereto; and
- a charging control circuit configured for operative coupling to a source of electrical power which is external to the trailer, the source of electrical power powering an antilock braking system, the charging control circuit configured to:
- monitor a current drawn from the source of electrical power to power at least the antilock braking system, the antilock braking system being constantly electrically connected to the source of electrical power;
- inhibit charging of the supercapacitor using the source of electrical power when the monitored current is above a predetermined threshold; and
- cause charging of the supercapacitor using the source of electrical power when the monitored current is below the predetermined threshold.

2. The apparatus of claim 1, wherein the electrically powered covering mechanism comprises an electrically powered motor or actuator, or an electrically powered pump or compressor operatively coupled to a hydraulic or pneumatic motor or actuator.

3. The apparatus of claim 1, wherein the charging control circuit is further configured to:
- switchably make, break, or both make and break, a connection between the source of electrical power and the supercapacitor based on an amount of the monitored current.

4. The apparatus of claim 3, wherein the charging control circuit is further configured to perform one of:
- when the monitored current is below the predetermined threshold, connect the source of electrical power to the supercapacitor, and when the monitored current is above the predetermined threshold, disconnect the source of electrical power from the supercapacitor;
- when the monitored current is below the predetermined threshold, connect the source of electrical power to the supercapacitor, the source of electrical power being otherwise normally disconnected to the supercapacitor; and
- when the monitored current is above the predetermined threshold, disconnect the source of electrical power from the supercapacitor, the source of electrical power being otherwise normally connected to the supercapacitor.

5. The apparatus of claim 1, wherein the charging control circuit comprises an input for connecting to the source of electrical power and an output for connecting to the antilock braking system, wherein monitoring current drawn from the source of electrical power to power at least the antilock braking system comprises monitoring current flowing from the input toward the output, and wherein charging of the supercapacitor using the source of electrical power comprises causing current to flow from the input toward the supercapacitor.

6. The apparatus of claim 1, wherein the trailer is configured to tow a further trailer in a road train configuration, and wherein the antilock braking system is on board the further trailer.

7. The apparatus of claim 1, wherein the antilock braking system is on board the trailer.

8. The apparatus of claim 1, wherein the control system is further configured to selectably apply power, with a selectable polarity, from the supercapacitor to the electrically powered covering mechanism.

9. The apparatus of claim 1, wherein the cover is flexible, and wherein the covering mechanism comprises a pivotable arm holding a rotatable roller for dispensing and receiving the cover.

10. A road transportation trailer comprising the apparatus according to claim 1.

11. A method for operating an electrically powered covering mechanism for covering an open top of a transportation trailer container, the method comprising:
- charging a supercapacitor mounted to the transportation trailer container or a trailer associated with same, wherein charging the supercapacitor comprises:
  - coupling a charging control circuit to a source of electrical power which is external to the trailer, the source of electrical power powering an antilock braking system;
  - monitoring, using the charging control circuit, current drawn from the source of electrical power to supply at least the antilock braking system, the antilock braking system being constantly electrically connected to the source of electrical power;

inhibiting, using the charging control circuit, charging of the supercapacitor using the source of electrical power when the monitored current is above a predetermined threshold; and causing, using the charging control circuit, charging of the supercapacitor using the source of electrical power when the monitored current is below the predetermined threshold; and using charge stored in the supercapacitor to operate the electrically powered covering mechanism to move a cover movable between a closed position in which the cover is disposed over the open top and an open position in which the open top is exposed.

12. The method of claim 11, wherein the electrically powered covering mechanism comprises an electrically powered motor or actuator, or an electrically powered pump or compressor operatively coupled to a hydraulic or pneumatic motor or actuator.

13. The method of claim 11, wherein charging the supercapacitor further comprises:

switchably making, breaking, or both making and breaking, a connection between the source of electrical power and the supercapacitor based on an amount of the monitored current.

14. The method of claim 13, wherein switchably making, breaking, or both making and breaking the connection further comprises one of:

when the monitored current is below the predetermined threshold, connecting, via the charging control circuit, the source of electrical power to the supercapacitor, and when the current is above the predetermined threshold, disconnecting, via the charging control circuit, the source of electrical power from the supercapacitor;

when the monitored current is below the predetermined threshold, connecting, via the charging control circuit, the source of electrical power to the supercapacitor, the source of electrical power being otherwise normally disconnected to the supercapacitor; and when the monitored current is above the predetermined threshold, disconnecting, via the charging control circuit, the source of electrical power from the supercapacitor, the source of electrical power being otherwise normally connected to the supercapacitor.

15. The method of claim 11, wherein the charging control circuit comprises an input for connecting to the source of electrical power and an output for connecting to the antilock braking system, wherein monitoring current drawn from the source of electrical power to supply at least the antilock braking system comprises monitoring current flowing from the input toward the output, and wherein charging of the supercapacitor using the source of electrical power comprises causing current to flow from the input toward the supercapacitor.

16. The method of claim 11, wherein the trailer is configured to tow a further trailer in a road train configuration, and wherein the antilock braking system is on board the further trailer.

17. The method of claim 11, wherein the antilock braking system is on board the trailer.

* * * * *